Jan. 9, 1951  D. T. JAMES  2,537,673
CLUTCH CONTROL MECHANISM
Filed Dec. 31, 1948  3 Sheets-Sheet 1

Inventor

David T. James

By Carlton C. Davis
Attorney

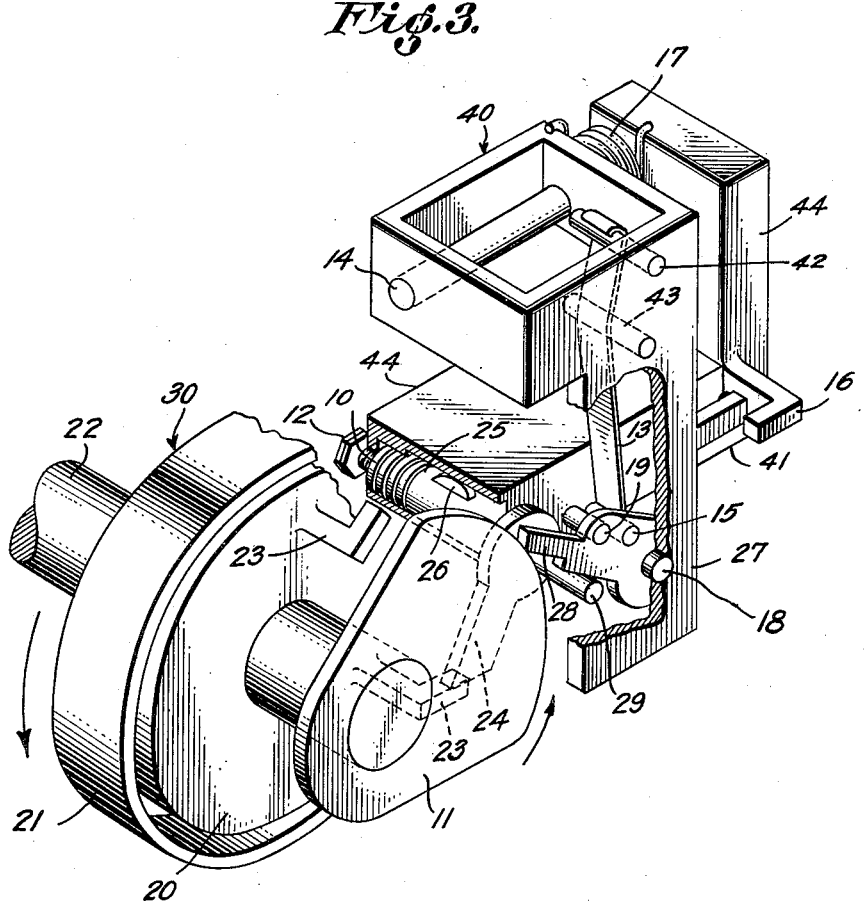

Patented Jan. 9, 1951

2,537,673

UNITED STATES PATENT OFFICE 2,537,673

CLUTCH CONTROL MECHANISM

David T. James, Middletown, Md.

Application December 31, 1948, Serial No. 68,707

1 Claim. (Cl. 192—29)

(Granted under the act of March 3, 1883, as amended April 30, 1928; 370 O. G. 757)

The invention described herein may be manufactured and used by or for the Government, for governmental purposes, without the payment to me of any royalty thereon.

This invention relates to clutch controls and its primary object is to provide an automatic latching and tripping mechanism for engaging and disengaging a clutch after it has made precisely one revolution.

Another important object is to provide such a mechanism for the extremely accurate and sensitive control of the transmission of power from a standard over-running type clutch to a primary operating machine, such as the Automatic Inoculating Apparatus described in the co-pending application of John C. Wagner and David T. James, Serial Number 65,542, filed December 16, 1948.

Another object is to provide such a mechanism wherein, regardless of whether or not the primary actuating means has moved out of contact, the release of the clutch is automatically engaged after one revolution and the delivery of power through the clutch is thereby stopped.

Other equally important objects will more plainly appear from the detailed specification and drawing herein presented in exemplification but not in limitation of the present invention. Like reference characters represent like parts in the accompanying drawing in which:

Fig. 3 is another isometric view of the same apparatus. Here a cam on the drive shaft of the clutch drum is shown rotating in a counter clockwise direction and raising a lever on the control mechanism in a clockwise direction in a manner which permits a stop on the control mechanism to be spring-pressed forwardly into its original tooth engaging and drum stopping position.

Figure 1:
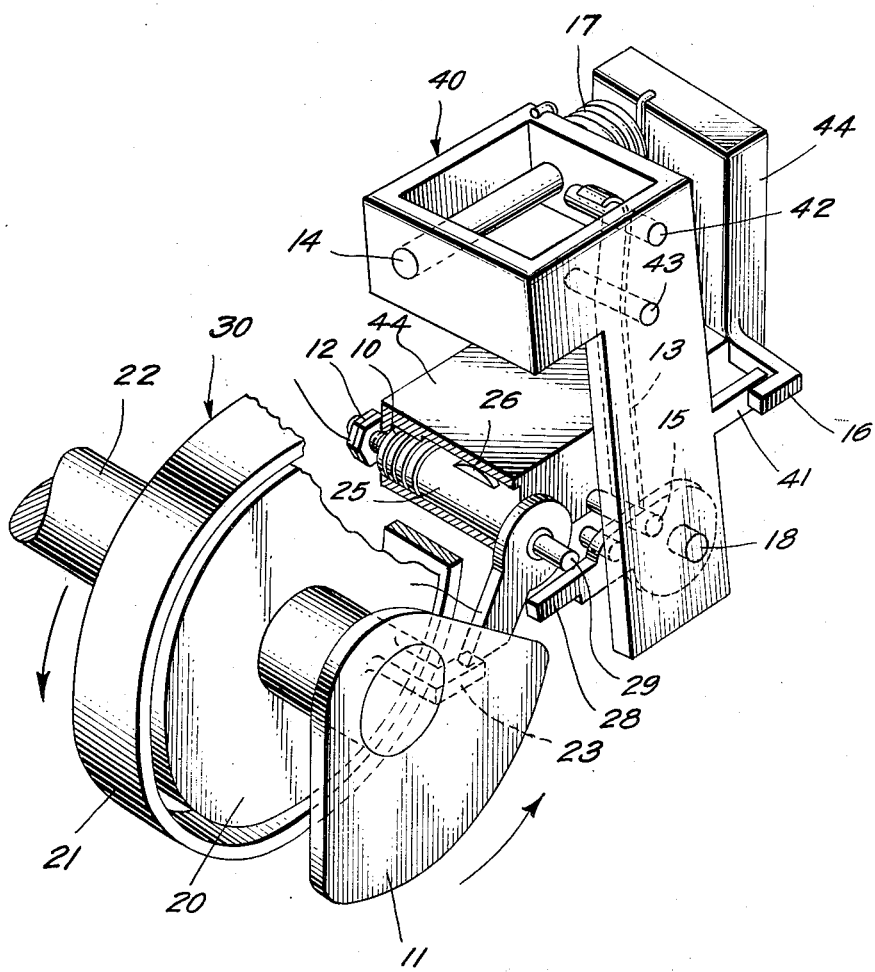
Fig. 1 is an isometric view showing the novel control mechanism and a standard type of clutch having its inner drum held in the stop or disengaged position by an obstructing finger or stop on the control mechanism. This stop is shown pressing against an actuating finger or tooth on the clutch drum in such a manner as to prevent rotation of the drum.

The clutch shown at 30 is intended to transmit power to a primary operating machine, (not shown) and to be controlled by the novel latching and tripping device indicated at 40.

Clutch 30 represents the well known over-running type which is sometimes referred to as an "over-riding clutch." A form of this clutch is illustrated and described in the U. S. Patent 2,140,737 entitled "Clutch" issued December 20, 1938 to Richard Griffith Dickens. As outer shell 21 is continuously rotated (by a source of power not shown), it delivers power continuously at the same rate to a shaft 22, until a clutch disengaging tooth 23 is brought against a stop such as shown at 24 in the present preferred embodiment. A disengagement is thereby effected within the clutch whereby outer shell 21 continues to rotate although power is no longer transmitted to shaft 22.

Control mechanism 40 comprises support 44, which carries on its upright portion pivot member 14, and on its base portion, plunger member 25. Mounted for rotation about pivot 14 is latching lever 27 provided with boss 41 normally held against stop 16 by torsion spring 17.

At the lower portion of lever 27 is pivot 18. Mounted for rotation about pivot 18 is tripping arm 28 provided with stop pin 19 for engaging rod 29 of plunger 25. Arm 28 also carries pin 15 for engaging the lower end of leaf spring 13. The upper portion of spring 13 is held in position by retaining pin 42 and fulcrum pin 43 in lever 27. Spring 13 is arranged to normally urge arm 28 and pin 19 downwardly against plunger rod 29.

Plunger 25 is held against rotation in its housing in base 44 by means of key 26 and is arranged to be normally urged forwardly toward arm 28 by means of coiled compression spring 10. Spring 10 is provided with an adjustable stop unit 12, on rod 29, which can be set to regulate the forward travel of plunger 25 and rod 29 so that, in operation, finger 24 fixed to rod 29 may reach a sufficiently advanced plane to engage tooth 23.

In operation, power is applied to rotate the driving shell 21 of clutch 30, and the revolution cycle may then be started by any suitable actuating member (not shown) carried by the primary machine and arranged to ride into and remain at least temporarily in contact with lever 27 of control mechanism 40 until "one revolution" cycle has been completed and the rotation of the drum has been brought to a halt. This actuating member moves the lever 27 rearwardly from the "stop drum" position shown in Fig. 1, to the disengaging position shown in Fig. 2. (In comparing these two views, it may be of aid to note the finger 41 is in contact with the stop 16 in Fig. 1 but in Fig. 2 this finger has moved away from the stop 16.) This movement, of course, forces the piston 25 rearwardly and slides the stop 24 off the tooth 23 and out of its plane of rotation.

This contact overcomes the normal action of spring 17 and depresses lever 27 inwardly on its pivot 14, toward base 44. This movement causes the lever arm 28 to push rod 29 and finger 24 which is fixed to rod 29 rearwardly against the action of spring 10. This causes finger 24 to become disengaged from tooth 23 in clutch 30. This immediately actuates the well known engaging mechanism in clutch 30, and shaft 22 immediately commences one revolution for the transmission of power through ring 21, and drum 20, to the primary machine.

At precisely the completion of one revolution of shaft 22, cam 11 which is attached to shaft 22, contacts and elevates lever arm 28 approximately 30° above the horizontal as shown by the arrow adjacent arm 28. This releases rod 29 which, under the forward urging of spring 10, immediately carries finger 24 into its forward position where it is stopped by the action of stop nut 12 on plunger rod 29. In this forward position, finger 24 immediately re-engages tooth 23 of clutch 30 which in turn instantly actuates the disengaging mechanism within clutch 30 and immediately stops the transmission of power through shaft 22 to the primary machine.

It will, of course, be understood that so long as the actuating member (not shown) on the primary machine continues to ride or press against the lever 27, the drum can make one, and only one, revolution. This is because the spring-pressed lever 27 must first return to the advanced position shown in Fig. 1 before it can be pressed rearwardly again. Only after the lever 27 has been snapped forward by its spring 17 into its advanced position, and then pressed rearwardly to the position shown in Fig. 2 can the drum make another revolution.

Figure 2:
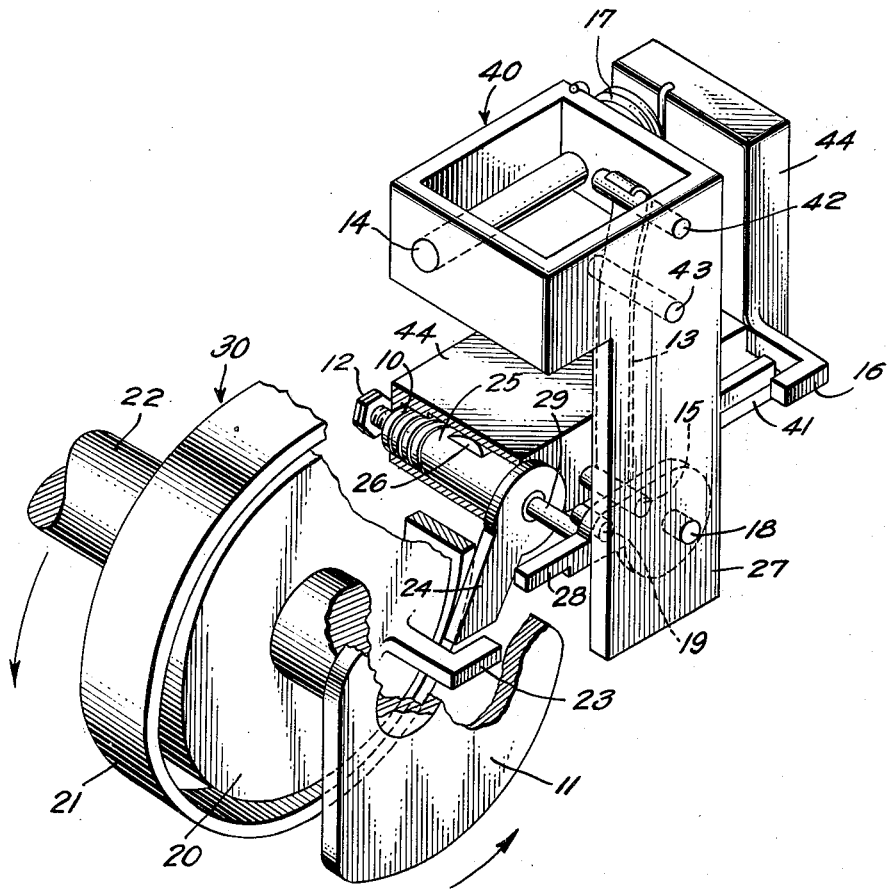
Fig. 2 is an isometric view showing the clutch mechanism of Fig. 1 as its stop is moving rearwardly and out of engagement with the actuating tooth on the inner drum of the clutch and out of the tooth's plane of rotation in order that the clutch drum may be permitted to be rotated by its outer shell. At this instant the drum is stationary—not yet having started to rotate.

Actuating members on some primary machines are designed to intermittently and at predetermined intervals engage the lever 27, push it rearwardly and then disengage this lever in order that it may snap back into position shown in Fig. 1. But whatever the arrangement, however, until the actuating member on the primary machine presses against the lever 27, no new revolution of the drum is possible. This feature of my invention is considered to be an important one as is well exemplified in the above egg inoculating machine illustrated and described in the above mentioned application for patent, Serial No. 65,542. Were the drum to rotate twice in this machine while the lever 27 is held in the position indicated in Fig. 2 of the instant application and the inoculating needle is inserted into an egg, the egg would be reinoculated and made useless for virus purposes.

This description covers the operation of the present invention for one revolution control; however, with a plurality of teeth similar to tooth 23, and with a plurality of lobes on cam 11, it is possible to attain automatic stopping at various fractional portions of one revolution of shaft 22.

In some cases, for use with scientific apparatus, it may be desirable to operate lever 27 by hand. In this case it will be seen that with the prompt release of lever 27 which is returned to its original position against stop 16 by spring 17, arm 28 may be out of the way of cam 11, but arm 28 will be followed in its return by finger 24 so that in this case finger 24 is in position to engage tooth 23 without the release action of arm 28.

In automatic operation, when lever 27 is against stop 16, lever arm 28 is held out of alignment with the plane of operation of cam 11.

When the cam 11 (see Fig. 3) pivots the arm 28 upwardly, the rod 29 of the spring-pressed plunger member 25 advances beneath this arm until it is halted by the stop nut 12 in a position in which the stop 24 is held in the plane of rotation of the tooth 23 on the drum 20 and consequently stops the further rotation of the drum. It should be noted that the arm 28 is then held in a diagonal position (see Fig. 3) by the rod 29 and that no further rotation of the drum is possible until the actuating member of the primary machine is moved out of engagement with the lever 27 and the lever 27 has snapped back into the position shown in Fig. 1. When the lever 27 is released from the pressure exerted by the actuator on the primary machine, it is advanced to the position shown in Fig. 1 by reason of the pressure exerted by the coil spring 17 in a counterclockwise direction and the spring-pressed arm 28, of course, moves with the lever. This action slides the arm 28 forwardly over the outer end of the rod 29 and the arm spring 13 forces it down between the rod 29 and the lever 27. The control mechanism will now repeat its cycle of operation when the lower end of lever 27 is again pushed rearwardly.

When the automatic clutch control mechanism is embodied in the automatic inoculating apparatus referred to herein, it is preferred to embody the clutch and its control in the displacement pump described in the co-pending application of David T. James and Arthur J. Rawson, filed December 31, 1948, Serial Number 68,708. In this case, such a pump may be operated by direct connection to a shaft such as indicated at 22 in Figure 1 of the present application. When such a connection is made, each revolution of shaft 22 would produce a 360 degree revolution of the above mentioned pump.

While the foregoing description reveals one preferred embodiment of the present invention, it is not limited thereto, but is intended to include all modifications thereof, within the spirit and scope of the appended claim.

I claim:

A clutch revolution control mechanism for controlling an over-running type of rotary clutch adapted to be driven by a primary drive machine, said clutch having a rotatable inner drum concentrically and rigidly mounted on a driven shaft carrying a cam off set from said drum and provided with an integral L-shaped tooth the stem of which projects from one side of said drum, an outer driving clutch member encircling said drum; said mechanism including a support, a spring-pressed tripping lever adapted to be intermittently engaged and disengaged pivoted to said support for limited rotation in a plane parallel with said driven shaft and spring-pressed arm pivotally connected to said tripping lever for limited rotation at right angles thereto, a spring-pressed plunger means slidably and rotatably mounted on said support, said plunger means being adapted for limited reciprocal movement in a path parallel to said drive shaft and having at one of its end portions a stop means to limit the movement of said plunger and a spring for urging said plunger in the direction of said lever and having at its opposite end portion a stop finger adapted to abut against said L-shaped tooth and prevent the rotation of said drum when said finger is moved into the plane of rotation of said tooth, said arm being adapted to be moved in and out of the plane of rotation of said cam in accordance with the movement of said lever and being also adapted to ride on said cam and to be pivotally raised by said cam above the plane of said spring-pressed plunger and thereby permit said plunger to move said stop member into the plane of rotation of said tooth when said arm is moved into the plane of rotation of said cam.

DAVID T. JAMES.

REFERENCES CITED

The following references are of record in the file of this patent:

UNITED STATES PATENTS

| Number | Name | Date |
|---|---|---|
| 1,810,317 | Lasker | June 16, 1931 |
| 2,441,314 | Ferris | May 11, 1948 |